US005842183A

United States Patent [19]

Delfer, III et al.

[11] Patent Number: 5,842,183

[45] Date of Patent: Nov. 24, 1998

[54] DYNAMICALLY UPDATED PAYMENT DUE DATE SYSTEM

[75] Inventors: Frank W. Delfer, III, Lebanon, N.J.; Lino E. Carnesecca, Lincoln, Calif.; Glenna M. Johnston, Cameron Park, Calif.; Cindy M. Spear, Rancho Murieta, Calif.

[73] Assignee: International Billings Services, Inc., Rancho Cordova, Calif.

[21] Appl. No.: 561,356

[22] Filed: Nov. 21, 1995

[51] Int. Cl.[6] .......... G06F 17/60

[52] U.S. Cl. .......... 705/34

[58] Field of Search .......... 705/1, 7, 34, 40, 705/42, 45, 400, 412

[56] References Cited

U.S. PATENT DOCUMENTS 5,220,501 6/1993 Lawlor et al. .
5,329,102 7/1994 Sansone .
5,649,117 7/1997 Landry .
5,684,965 11/1997 Pickering .

*Primary Examiner*—Robert A. Weinhardt
*Attorney, Agent, or Firm*—James M. Ritchey

[57] ABSTRACT

For use with the production of a billing document, a system and method for printing billing information on the billing document comprises a computer controlled system, suitable programming, that establishes a target mail date, determines the eligibility of the billing document for inclusion in the system, verifies that the billing document will be mailed on the target mail date, and changes the billing information printed on the billing document if the verification process determines that the billing document will not be mailed on the target mail date.

33 Claims, 1 Drawing Sheet

DYNAMICALLY UPDATED PAYMENT DUE DATE SYSTEM

BACKGROUND OF THE INVENTION

1. Field of the Invention

For use in the collection of revenues owed by a consumer to a service provider, a system is disclosed to decrease the period of time required to process statement data and to mail statements. More specifically, presented is a computer interfaced statement billing system that rapidly processes and prints billing statements that include a statement due date that provides sufficient notice of the due date to the consumer, as determined by imposed, often local, regulations, in which the sufficiency of the notice is measured by the time interval between an actual mailing date for each billing statement and the due date for payment of that billing statement.

2. Description of the Background Art

Billing statements and equivalent items of service providers (e.g., telephone companies, cable audio and visual companies, and the like) are often processed for the service providers by bulk mailing entities having the technical know-how and facilities to service these clients. Further, bulk mailers that process such billing statements operate on basic requirements that, according to various regulatory agencies (usually state and federal rules), each consumer is mandated to have at least a minimum number of days in which to pay for services they have received. Generally, these imposed regulations have penalties for the service provider or bulk mailer or both for not providing a sufficient time between the actual mailing date of the billing statement and the due date for the statement or for other requirements such as sending a date-stamped envelope, due dates not falling on specified days of the week, and the like.

Traditionally, the service provider gives the necessary billing data to the bulk mailer and the bulk mailer then processes the entire job and mails the generated billing statements. The actual processing time for handling the billing data, printing statements, and filling envelopes may take several days and in order to provide the mandated time interval for notice on every mailed billing statement a due date is set on all of the mailed statements that insures that the mailing of the last actual billing statement does not violate the time window of notice. Unfortunately, by placing the due date to satisfy the statements mailed last, the earlier mailed statements extend the payment interval to larger than the required time period. The result of the traditional processing method is to decrease revenue flow to the service provider by permitting the consumer to pay within a larger window of time. The subject invention overcomes these traditional limitations by calculating and printing the payment due date on each statement according to when that statement was actually processed and mailed. Thus, a dynamic process is initiated which maximizes the revenue flow for the service providers by giving the consumers only the mandated time interval in which to pay the statement and not the excessive time period that previously existed.

The foregoing information reflects the state of the art of which the applicant is aware and is tendered with the view toward discharging applicant's acknowledged duty of candor in disclosing information which may be pertinent in the examination of this application. It is respectfully submitted, however, that this information does not teach or render obvious in any manner the applicant's claimed invention.

SUMMARY OF THE INVENTION

An object of the present invention is to provide a system and method for decreasing the interval of time necessary for processing a billing statement.

Another object of the present invention is to supply a system and method for dynamically setting a due date for payment of a billing statement based upon appropriate regulations and an actual mailing date for the billing statement and printing that calculated due date on the billing statement.

A further object of the present invention is to disclose system and method for increasing incoming revenues of a service provider by rapidly processing billing statement data and shortening the time between the end of the processing and the time payment is due.

Still another object of the present invention is to present flexible system and method for dynamically setting a due date for payment of a billing statement based upon necessary regulations for a sufficient time notice in which specific time intervals must exist between an actual mailing date for each billing statement and a due date for each billing statement.

Yet a further object of the present invention is to furnish means for processing billing statements in which the time interval between an actual mailing date and a due date is calculated according to suitable requirements and the calculated due date is printed on each statement.

Disclosed is a billing system and method of utilization for use with the production of a billing document comprising a mailing envelope and a statement, wherein the statement reflects charges to a consumer by a provider. The system is for printing billing information including a due date on the billing document, and, if required, a date of mailing on the mailing envelope. Comprising the subject system is a computer means for controlling the system and manipulating billing document related data files, means for establishing a target mail date, means for determining the eligibility of the billing document for inclusion in the system, means for verifying that the billing document will be mailed on the target mail date, means for updating the due date to be printed on the billing document if the verification means determines that the billing document will not be mailed on the target mail date, means for establishing if the mailing envelope requires a date of mailing printed on the mailing envelope, and means for printing the billing document with the billing information including the updated due date printed on the statement and, if required, a date of mailing on the mailing envelope.

Included is a method for printing billing information including an updated payment due date on the billing document comprising a mailing envelope and a statement, wherein the billing document reflects charges to a consumer by a provider. The method comprises the steps of controlling a system implementing the method and manipulating billing document related data files with computer means, establishing a target mail date, determining the eligibility of the billing document for including an updated payment due date, verifying that the billing document will be mailed on the target mail date, updating the payment due date printed on the billing document if the verification means determines that the billing document will not be mailed on the target mail date, and printing the billing document with the billing information including the updated payment due date printed on the statement of the billing document.

Other objects, advantages, and novel features of the present invention will become apparent from the detailed description that follows, when considered in conjunction with the associated drawings.

DESCRIPTION OF THE PREFERRED EMBODIMENT

Figure 1:
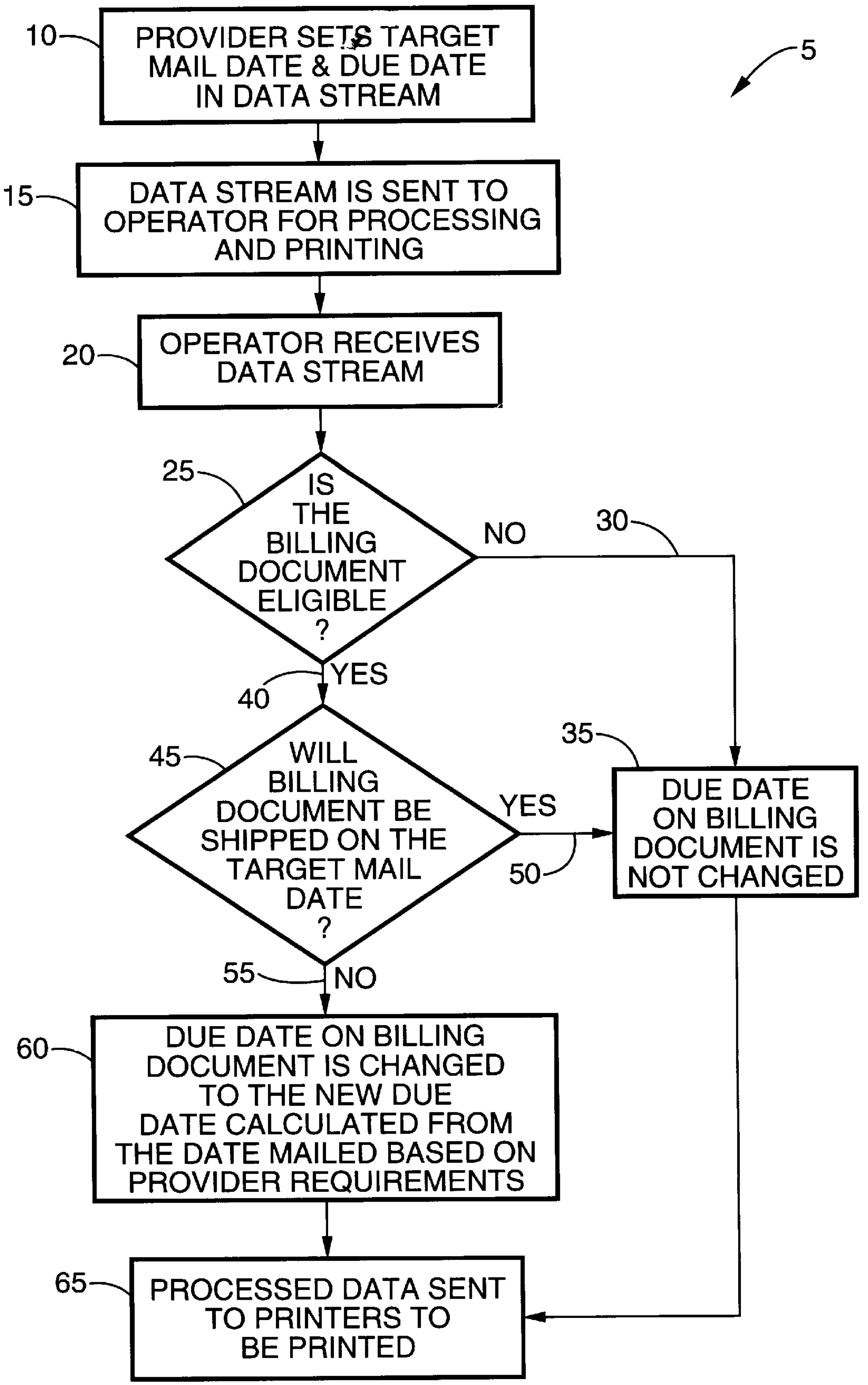
FIG. 1 is a flow diagram that illustrates components comprising the subject invention.

Referring now to the flow diagram depicted in FIG. 1, there is shown a preferred embodiment of a dynamic statement processing system 5 that is utilized by an operator to process billing documents. For illustrative purposes only, the subject invention will be described as being utilized by an "operator." Usually, an operator is a bulk mailer that services accounts for providers, customers, or clients. In particular a typical provider or customer may be a provider of services, products, or other similar items who charges consumers for what is provided. Generally, the provider or customer are utility providers, cable services providers, merchandisers, and the like.

A billing document usually comprises the sending envelope, a billing statement having one or more pages, various inserts such as a return envelope, advertisements, coupons, legal announcements, and comparable articles. Typically, denoted in each billing document is billing information comprising numerous items such as the date of mailing, a payment due date (payment after this date usually incurs a late fee), names, addresses, account numbers, charges for what ever is provided, and other identification and operational indicia.

For the subject system and method, the payment due date and the actual mailing date are important. In particular and as indicated above, regulatory agencies (such as those operated by the individual states) often mandate that a defined period of time exist between the date of mailing a billing document and the date by which payment must be made. To present sufficient notice of this time window for payment to the consumer most states require that a payment due date be clearly indicated somewhere on the billing document and usually on the billing statement. Additionally, some states dictate that not only must the payment due date be indicated on the billing document, but that the envelope must be stamped with an actual date of mailing to insure the period between the mailing date and payment due date yields a window sufficiently large to be within the mandated time frame.

Many states have similar, but not exactly identical requirements concerning the necessary information that is to be printed on a billing document (commonly regulated by a state Public Utilities Commission (PUC) or equivalent body). To process efficiently bulk billing document mail going to different states, the state mandated requirements are included or programmed into the controlling computer for the subject system and method. Examples follow for the billing information, including payment due date, that is required or mandated in different exemplary states (states A–E correspond to actual states and their current mandates, but since the exact requirements may change, generic letters are utilized instead of actual state names):

1. State A—Due date=Mail date+21 days Sending envelopes are date-stamped
2. State B—Due date=Mail date+17 days Due date cannot be a Saturday, Sunday, holiday, or non-workday.
3. State C—Residential accounts: Due date=Mail date+21 days Business accounts: Due date=Bill period date+19 days
4. State D—Due date=Mail date+14 days Sending envelopes are date-stamped
5. State E—Due date=Mail date+17 days As can be seen from the above state-by-state mandates the window for payment varies, as do requirements concerning business accounts, mailing dates printed on the sending envelope, and other comparable data not directly mentioned, but within the realm of this disclosure.

In particular, the subject invention permits a provider or customer to increase their cash flow by decreasing the number of days required to process their billing data, get their billing statements into the mail stream, and collect the resulting revenue. In this process the operator strives to mail the statements sooner than a "target mail date" that is identified by the provider or customer and updates the payment due date on the billing document, generally the billing statement, by the same number of days, whenever appropriate.

Additional functions that are included in the subject system and method are notifying a provider or customer (usually electronically and automatically) of each updated payment due date, recording the success statistics of the operator in beating the target due date, and providing the provider or customer and operator accounting systems with data for analyzing possible incentive plans for increasing the cash flow of the provider or customer.

Concerning the specifics of the subject system 5 shown in FIG. 1, generally, via a computer means the provider places into a data stream 10 a set target mail date, thereby establishing the target mail date, and indicates (either previously or contemporaneously) what rules must be followed to determine a payment due date for that particular job, thereby establishing the payment due date which has, as of this point, no updating to consider an actual earlier mail date. The data format is matched for the requirements of the provider and operator and may be any suitable format now known or later developed. Depending upon the wishes of a particular provider, the target mail date could be set in advance based on a given monthly date or similar value. It is noted that in addition to the target mail date and payment due date, other necessary information (such as identifying indicia, amount due, and the like) concerning each consumer is also transmitted to the operator. Upon producing the data stream, the data stream is sent 15 by standard means (electronic transfer, physical transfer, and equivalent procedures either directly or indirectly) to the operator for processing of the billing documents.

Computer means are required by the operator to control and oversee the subject system and method. The computer means usually comprises a central computer or computers with links to suitable inputting and outputting means including networks and equivalents, physical means (tapes, disks, and the like), and like systems and items. Generally, local PC type or equivalent computer units are appropriately interfaced together with the larger and more sophisticated central computer(s). Technicians or computer operators run and help coordinate the various computers and handle unexpected problems with suitable manual manipulations or other actions.

The computer means is adapted and programmed appropriately to carry out the steps found in the subject method. Data file storage means, data transmission means, interfacing means, and like standard components that are required to carry out the subject process are known to those skilled in the relevant art and are incorporated into the subject system.

The operator or bulk mail processor receives 20 the data stream from the provider and prepares to process the data stream into the physical billing documents. FIG. 1 uses the term billing document, but this includes the actual billing statement ( a one or multiple page document) on which the payment due date is usually printed. Even though the payment due date is usually printed on the billing statement, the payment due date can be printed on the mailing envelope or any other piece comprising the billing document.

Means are provided for determining if a billing document is eligible for inclusion in the subject system. Once the data stream is received 20 by the operator a query is made as to whether or not each billing document (usually one for each consumer) is eligible for processing 25 by the subject system and method to create an updated payment due date. If the billing document is not eligible 30 for an updated payment due date, the payment due date on the billing document is not changed 35. However, if the billing document is eligible 40 for an updated payment due date, the processing steps to location 45 on the flow diagram in which the program (found in software or hardware) asks if the billing document will be shipped on the target mail date. Usually, eligibility 40 for processing a billing document via the subject system is based on the provider appropriately flagging billing document data in the incoming stream. Generally, a dynamic due date flag is set for an entire group of billing documents within a particular job, but individual billing statements can be flagged for dynamic due date processing. Alternatively, eligibility 40 may be based on other factors such as whether an earlier actual mailing date than the target mail date can be achieved by the operator, thereby allowing an increase in the cash flow for the provider, known and considered PUC regulations, and other appropriate considerations.

Verification means are supplied for determining if the billing document will be mailed on the target mail date. Once a billing document or group of billing documents is passed on 40 for dynamic due date processing, a decision is made by the programming (or optionally by a manual process) as to whether or not the billing document will be mailed or shipped on the target mail date 45. The decision is based upon whether or not the operator will be able to process the billing document and have it enter the postal stream prior to the target mail date. If the billing document will be mailed on the target mail date 50 then the payment due date on the billing document will not be changed or updated 35. However, if the billing document will not be shipped on the target mail date, but will be shipped before (or even after) the target mail date 55 the payment due date on the billing document is changed to the updated payment due date 60. The updated payment due date is calculated by a suitable program utilizing selected rules for each locality (such as the state situations illustrated above) and are generally provided by the provider to the operator, but may be obtained by the operator independently from the provider.

Means are included for changing the billing information (including the payment due date) on the billing document if the verification means determines that the billing document will not be mailed on the target mail date. Information from logical step 35 that indicates which billing documents are not to have their payment due date updated and information from logical step 60 which indicates which billing documents will have their payment due date altered to an updated version merge at logical step 65 in which the process data is sent to appropriate printers for printing.

Printer means is furnished for printing the changed or updated billing formation (updated payment due date and, if required, mailing date on the sending envelope) on the billing document. Usually, printers are interfaced by standard means to the decision making system or controlling computer means. Printers include suitably selected machines such as those made by Xerox, IBM, Siemens, and the like.

Once again, it is noted that in the above description the term billing document includes the mailing or sending envelope and statement and that billing information includes payment due date, sending envelope date of mailing stamp, and the like.

Generally, once the selected billing documents have been updated, the provider is provided with information confirming that specific changes or updating did in fact occur. Transmission of this updating information is by standard means.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. For use with the production of billing documents, a system for updating billing information on each eligible billing document; comprising:

a) means for establishing a target mail date;

b) means for determining the eligibility of each billing document for updated billing information;

c) means for verifying that each billing document will be mailed on said target mail date; and d) means for updating the billing information to be printed on each eligible billing document if said verification means determines that the billing document will not be mailed on said target mail date.

2. A system according to claim 1, further comprising means for printing said updated billing information on each eligible billing document.

3. For use with the production of billing documents, a system for updating billing information on each eligible billing document; comprising:

a) computer means for controlling the system and manipulating billing document related data files;

b) means for establishing a target mail date;

c) means for determining the eligibility of each billing document for updated billing information;

d) means for verifying that each billing document will be mailed on said target mail date; and e) means for updating the billing information to be printed on each eligible billing document if said verification means determines that the billing document will not be mailed on said target mail date.

4. A system according to claim 3, further comprising printing means for printing each eligible billing document with said updated billing information.

5. For use with the production of billing documents, a system for printing both updated billing information on an eligible billing document and non-updated billing information on a non-eligible billing document; comprising:

a) computer means for controlling the system and manipulating billing document related data files;

b) means for establishing a target mail date;

c) means for determining the eligibility of each billing document to be printed with updated billing information;

d) means for verifying that each billing document will be mailed on said target mail date;

e) means for updating the billing information to be printed on each eligible billing document if said verification means determines that the billing document will not be mailed on said target mail date; and f) printing means for printing the billing document with said updated billing information.

6. For use with the production of a billing statement that reflects charges to a consumer by a provider, a system for updating a payment due date to be printed on an eligible billing statement; comprising:

a) means for establishing a target mail date;

b) means for determining the eligibility of the billing statement for inclusion in the updating system;

c) means for verifying that the billing statement will be mailed on said target mail date;

d) means for updating the due date on the billing statement if said verification means determines that the billing statement will not be mailed on said target mail date; and e) means for communicating with a printer to print said updated due date on the billing statement.

7. For use with the production of a billing statement that reflects charges to a consumer by a provider, a system for printing an updated payment due date on an eligible billing statement; comprising:

a) computer means for controlling the system;

b) means for establishing a target mail date;

c) means for determining the eligibility of the billing statement for inclusion in the updating system;

d) means for verifying that the billing statement will be mailed on said target mail date;

e) means for updating the due date on the billing statement if said verification means determines that the billing statement will not be mailed on said target mail date; and f) means for printing said updated due date on the billing statement.

8. For use with the production of a billing document comprising a mailing envelope and a statement, wherein the statement reflects charges to a consumer by a provider, a system for updating billing information including an updated due date on an eligible billing document; comprising:

a) means for establishing a target mail date;

b) means for determining the eligibility of the billing document for inclusion in the updating system;

c) means for verifying that the billing document will be mailed on said target mail date; and d) means for updating the due date to be printed on the billing document if said verification means determines that the billing document will not be mailed on said target mail date.

9. A system according to claim 8, further including printing means for printing the billing document with said billing information including said updated due date printed on the statement.

10. For use with the production of a billing document comprising a mailing envelope and a statement, wherein the statement reflects charges to a consumer by a provider, a system for printing billing information including an updated due date on an eligible billing document; comprising:

a) computer means for controlling the system and manipulating billing document related data files;

b) means for establishing a target mail date;

c) means for determining the eligibility of the billing document for inclusion in the updating system;

d) means for verifying that the billing document will be mailed on said target mail date;

e) means for updating said due date printed on the billing document if said verification means determines that the billing document will not be mailed on said target mail date; and f) printing means for printing the billing document with said billing information including said updated due date.

11. A system according to claim 10, wherein said updated due date is printed on the statement of the eligible billing document.

12. For use with the production of a billing document comprising a mailing envelope and a statement, wherein the statement reflects charges to a consumer by a provider, a system for printing billing information including an updated due date on an eligible billing document; comprising:

a) computer means for controlling the system and manipulating billing document related data files;

b) means for establishing a target mail date;

c) means for determining the eligibility of the billing document for inclusion in the updating system;

d) means for verifying that the billing document will be mailed on said target mail date;

e) means for updating said due date to be printed on each eligible billing document if said verification means determines that the billing document will not be mailed on said target mail date; and f) printing means for printing the billing document with said billing information including said updated due date printed on the statement of the eligible billing document.

13. For use with the production of a billing document comprising a mailing envelope and a statement, wherein the statement reflects charges to a consumer by a provider, a system for updating billing information including an updated due date to be printed on an eligible billing document, and, if required, a date of mailing on the mailing envelope; comprising:

a) means for establishing a target mail date;

b) means for determining the eligibility of the billing document for inclusion in the updating system;

c) means for verifying that the eligible billing document will be mailed on said target mail date;

d) means for updating said due date to be printed on the eligible billing document if said verification means determines that the billing document will not be mailed on said target mail date; and e) means for establishing if the mailing envelope requires a date of mailing to be printed on the mailing envelope.

14. A system according to claim 13, further including printing means for printing the billing document with said billing information including said updated due date printed on the statement and, if required, a date of mailing on the mailing envelope.

15. For use with the production of a billing document comprising a mailing envelope and a statement, wherein the statement reflects charges to a consumer by a provider, a system for printing billing information including an updated due date on an eligible billing document, and, if required, a date of mailing on the mailing envelope; comprising:

a) computer means for controlling the system and manipulating billing document related data files;

b) means for establishing a target mail date;

c) means for determining the eligibility of the billing document for inclusion in the system;

d) means for verifying that the eligible billing document will be mailed on said target mail date;

e) means for updating said due date to be printed on the eligible billing document if said verification means determines that the billing document will not be mailed on said target mail date;

f) means for establishing if the mailing envelope requires a date of mailing printed on the mailing envelope; and g) means for printing the eligible billing document with said billing information including said updated due date printed on the statement and, if required, a date of mailing on the mailing envelope.

16. A method for updating billing information to be printed on a billing document comprising a mailing envelope and a statement, wherein the statement reflects charges to a consumer by a provider, the method comprising the steps:

a) establishing a target mail date;

b) determining the eligibility of the billing document for including the updated billing information;

c) verifying that the billing document will be mailed on said target mail date; and d) updating the billing information to be printed on the eligible billing document if said verification means determines that the eligible billing document will not be mailed on said target mail date.

17. A method according to claim 16, further comprising printing said updated billing information on the eligible billing document.

18. A method for updating billing information to be printed on a billing document comprising a mailing envelope and a statement, wherein the statement reflects charges to a consumer by a provider, the method comprising the steps:

a) controlling the method by computer means;

b) establishing a target mail date;

c) determining the eligibility of the billing document for including the updated billing information;

d) verifying that the eligible billing document will be mailed on said target mail date; and e) updating the billing information to be printed on the eligible billing document if said verification determines that the eligible billing document will not be mailed on said target mail date.

19. A method according to claim 18, further comprising the step of printing the eligible billing document that will not be mailed on said target mail date with said updated billing information.

20. A method for including updated billing information on a billing document comprising a mailing envelope and a statement, wherein the statement reflects charges to a consumer by a provider, the method comprising the steps:

a) controlling the method by computer means;

b) establishing a target mail date;

c) determining the eligibility of the billing document for including the updated billing information;

d) verifying that the eligible billing document will be mailed on said target mail date;

e) updating the billing information to be printed on the eligible billing document if said verification determines that the eligible billing document will not be mailed on said target mail date; and f) printing the eligible billing document that will not be mailed on said target mail date with said updated billing information.

21. A method for updating a payment due date printed on a billing statement, wherein the statement reflects charges to a consumer by a provider, the method comprising the steps:

a) establishing a target mail date;

b) determining the eligibility of the billing statement for including an updated payment due date;

c) verifying that the eligible billing statement will be mailed on said target mail date;

d) updating the payment due date on the eligible billing statement if said verification determines that the eligible billing statement will not be mailed on said target mail date; and e) communicating with a printer to print said updated payment due date on the eligible billing statement if the eligible billing document will not be mailed on said target mail date.

22. A method for updating a payment due date printed on a billing statement, wherein the statement reflects charges to a consumer by a provider, the method comprising the steps:

a) controlling the method by computer means;

b) establishing a target mail date;

c) determining the eligibility of the billing statement for including an updated payment due date;

d) verifying that the eligible billing statement will be mailed on said target mail date;

e) updating the payment due date on the eligible billing statement if said verification determines that the eligible billing statement will not be mailed on said target mail date; and f) printing said updated payment due date on the eligible billing statement if the eligible billing document will not be mailed on said target mail date.

23. A method for updating information including an updated payment due date to be printed on a billing document comprising a mailing envelope and a statement, wherein the billing document reflects charges to a consumer by a provider, the method comprising the steps:

a) establishing a target mail date;

b) determining the eligibility of the billing document for including an updated payment due date;

c) verifying that the eligible billing document will be mailed on said target mail date; and d) updating the payment due date to be printed on the eligible billing document if said verification means determines that the eligible billing document will not be mailed on said target mail date.

24. A method according to claim 23, further including printing the eligible billing document with said billing information including said updated payment due date on the statement if the eligible billing document will not be mailed on said target mail date.

25. A method for printing billing information including an updated payment due date on a billing document comprising a mailing envelope and a statement, wherein the billing document reflects charges to a consumer by a provider, the method comprising the steps:

a) controlling a system implementing the method and manipulating billing document related data files with computer means;

b) establishing a target mail date;

c) determining the eligibility of the billing document for including an updated payment due date;

d) verifying that the eligible billing document will be mailed on said target mail date;

e) updating the payment due date to be printed on the eligible billing document if said verification means determines that the eligible billing document will not be mailed on said target mail date; and f) printing the eligible billing document with said billing information including said updated payment due date.

26. A method according to claim 25, wherein said updated payment due date is printed on the statement of the eligible billing document.

27. A method for printing billing information including an updated payment due date on a billing document comprising a mailing envelope and a statement, wherein the billing document reflects charges to a consumer by a provider, the method comprising the steps:

a) controlling a system implementing the method and manipulating billing document related data files with computer means;

b) establishing a target mail date;

c) determining the eligibility of the billing document for including an updated payment due date;

d) verifying that the eligible billing document will be mailed on said target mail date;

e) updating the payment due date to be printed on the eligible billing document if said verification means determines that the eligible billing document will not be mailed on said target mail date; and f) printing the eligible billing document with said billing information including said updated payment due date printed on the statement of the eligible billing document if the eligible billing document will not be mailed on said target mail date.

28. A method utilized by a bulk mail operator for updating billing information for a provider including an updated payment due date to be printed on a billing document comprising a mailing envelope and a statement, wherein the billing document reflects charges to a consumer by the provider, the method comprising the steps:

a) setting a target mail date and a payment due date in a data stream;

b) sending said data stream to the operator;

c) receiving by the operator of said sent data stream;

d) establishing if the billing document is eligible for having the payment due date updated;

e) determining if said eligible billing document will be shipped on said target mail date; and f) changing the payment due date to be printed on said eligible billing document to said updated payment due date.

29. A method according to claim 28, further comprising sending data containing said updated payment due date to printers for printing the eligible billing document with said updated payment due date.

30. A method according to claim 29, further comprising printing the eligible billing document with said updated payment due date.

31. A method according to claim 28, further comprising notifying the provider with said updated payment due date.

32. A method utilized by a bulk mail operator for printing billing information for a provider including an updated payment due date on a billing document comprising a mailing envelope and a statement, wherein the billing document reflects charges to a consumer by the provider, the method comprising the steps:

a) setting a target mail date and a payment due date in a data stream;

b) sending said data stream to the operator;

c) receiving by the operator of said sent data stream;

d) establishing if the billing document is eligible for having the payment due date updated;

e) determining if said eligible billing document will be shipped on said target mail date;

f) changing the payment due date to said updated payment due date;

g) sending data containing said updated payment due date to printers for printing the eligible billing document with said updated payment due date if the eligible billing document will not be mailed on said target mail date; and h) printing the eligible billing document with said updated payment due date if the eligible billing document will not be mailed on said target mail date.

33. A method according to claim 32, further comprising notifying the provider with said updated payment due date.

* * * * *